(12) United States Patent
Neyer

(10) Patent No.: US 9,902,444 B2
(45) Date of Patent: Feb. 27, 2018

(54) CHAIN LINK FOR A CRAWLER DRIVE

(71) Applicant: Liebherr-Mining Equipment Colmar SAS, Colmar (FR)

(72) Inventor: Frédéric Neyer, Mulhouse (FR)

(73) Assignee: Liebherr-Mining Equipment Colmar SAS, Colmar (FR)

( * ) Notice: Subject to any disclaimer, the term of this patent is extended or adjusted under 35 U.S.C. 154(b) by 11 days.

(21) Appl. No.: 14/806,190

(22) Filed: Jul. 22, 2015

(65) Prior Publication Data
US 2016/0023697 A1   Jan. 28, 2016

(30) Foreign Application Priority Data

Jul. 25, 2014   (DE) .................. 10 2014 011 143

(51) Int. Cl.
*B62D 55/20* (2006.01)
*B62D 55/12* (2006.01)
*B62D 55/21* (2006.01)

(52) U.S. Cl.
CPC .......... *B62D 55/202* (2013.01); *B62D 55/12* (2013.01); *B62D 55/20* (2013.01); *B62D 55/21* (2013.01)

(58) Field of Classification Search
CPC ....... B62D 55/202; B62D 55/21; B62D 55/20
See application file for complete search history.

(56) References Cited

U.S. PATENT DOCUMENTS

| | | | | |
|---|---|---|---|---|
| 1,409,577 A * | 3/1922 | Reyoum | ................ | B62D 55/20 305/162 |
| 2,353,122 A * | 7/1944 | Bigley, Jr. | ............. | B62D 55/12 305/195 |
| 2,392,406 A | 1/1946 | Porter | | |
| 2,618,516 A * | 11/1952 | Smith | .................... | B62D 55/08 305/111 |
| 2,727,794 A * | 12/1955 | Davidson | ............... | B62D 55/12 305/196 |
| 4,021,081 A * | 5/1977 | Orpana | ................. | B62D 55/12 305/164 |
| 5,131,728 A * | 7/1992 | Katoh | .................. | B62D 55/244 305/174 |
| 5,409,306 A * | 4/1995 | Bentz | .................... | B62D 55/20 305/185 |
| 2011/0221266 A1* | 9/2011 | Bonnetain | ............ | B62D 55/202 305/202 |

FOREIGN PATENT DOCUMENTS

| | | |
|---|---|---|
| DE | 3316972 A1 | 11/1984 |
| DE | 4442428 A1 | 6/1995 |
| EP | 2008919 A1 | 12/2008 |
| FR | 2704823 A1 * 11/1994 ........... B62D 55/202 |
| GB | 569336 A | 5/1945 |
| WO | 03/004336 A1 | 1/2003 |

* cited by examiner

*Primary Examiner* — Joe Morano, IV
(74) *Attorney, Agent, or Firm* — Dilworth & Barrese, LLP

(57) ABSTRACT

The present invention relates to a chain link for a crawler chain, wherein the chain link comprises at least two roller tracks extending in parallel, on whose running surfaces at least one track roller is movable during operation of the crawler, wherein the running surfaces of the at least two roller tracks are asymmetrical.

12 Claims, 8 Drawing Sheets

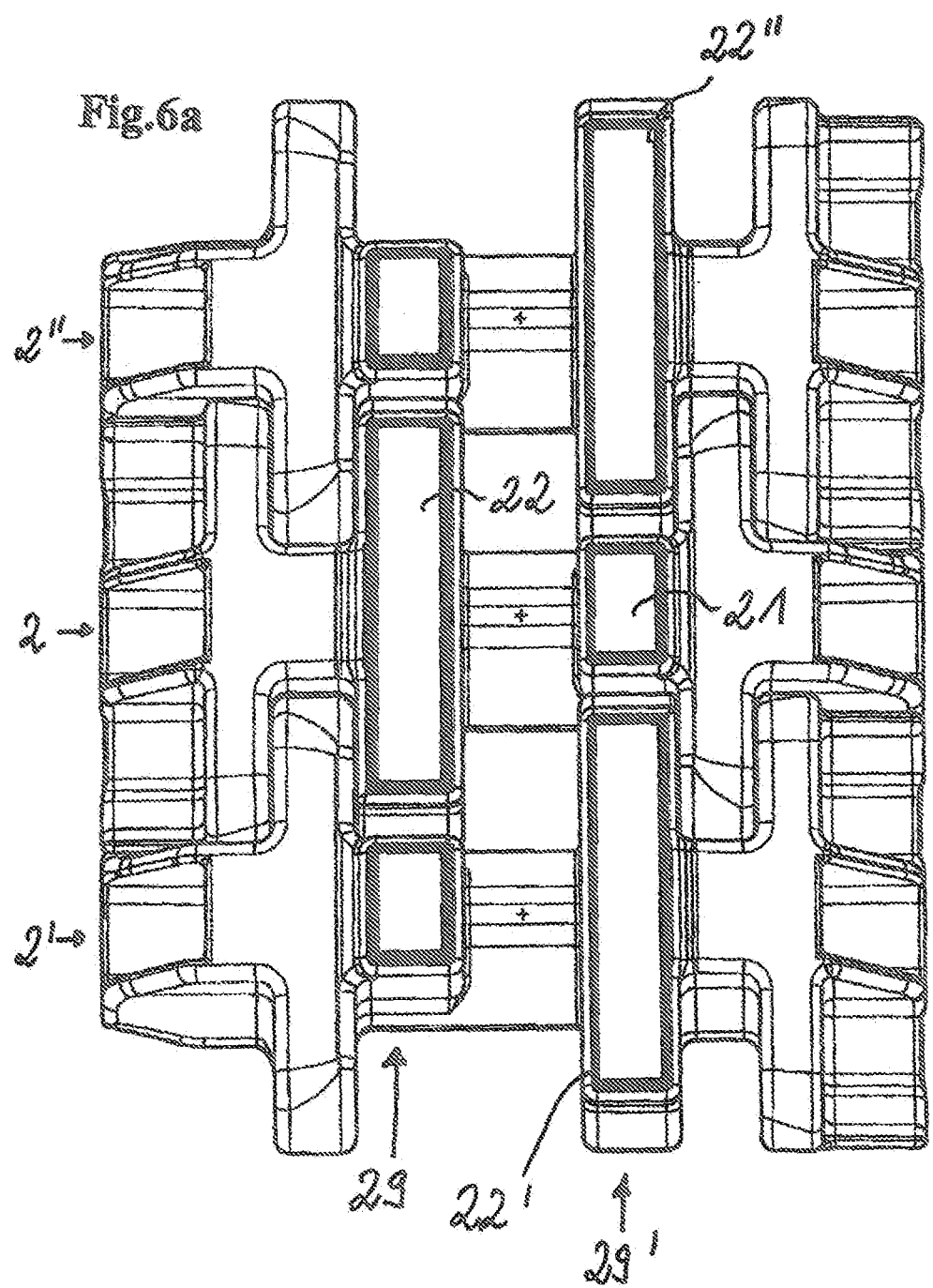

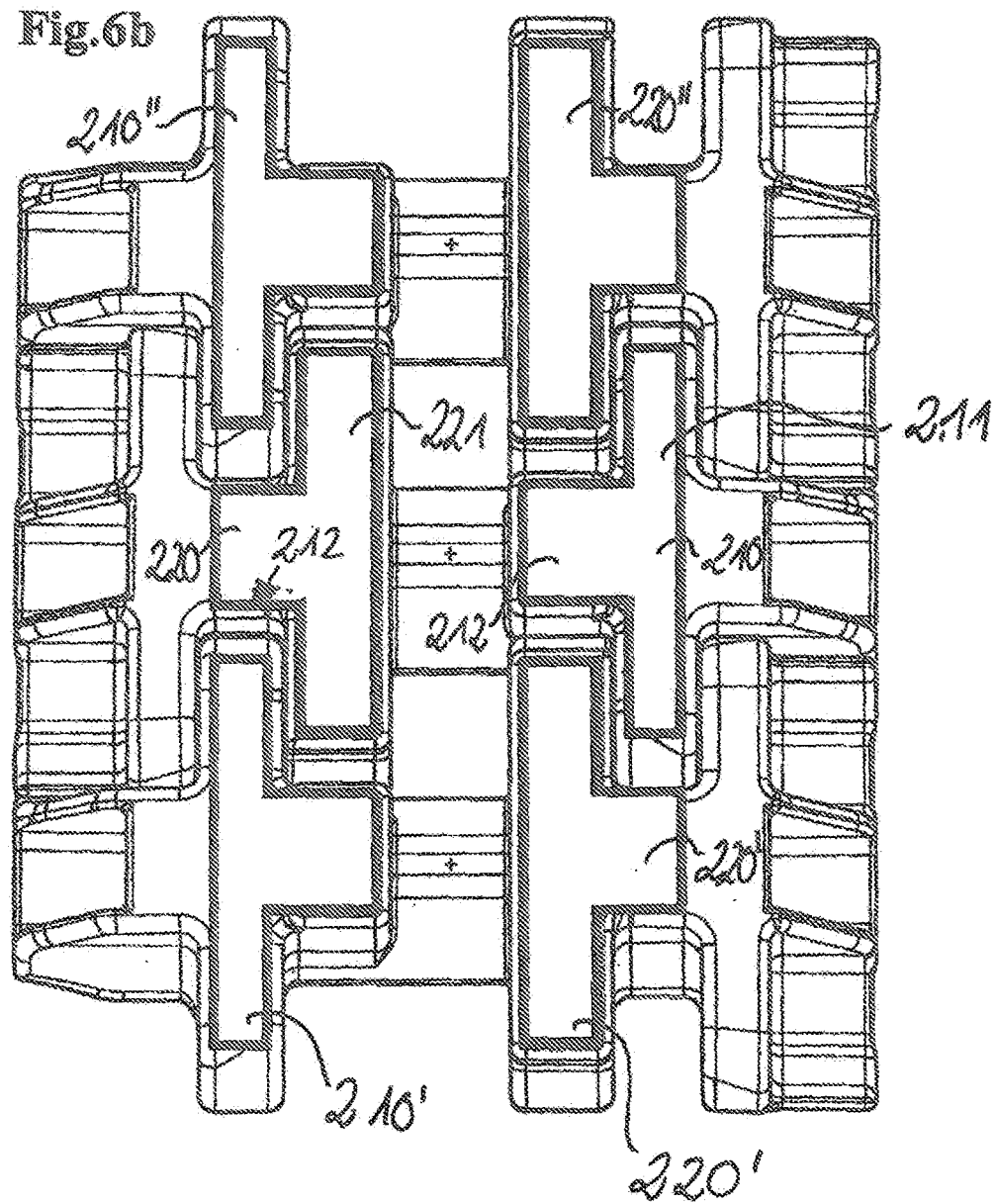

CHAIN LINK FOR A CRAWLER DRIVE

BACKGROUND OF THE INVENTION

The invention relates to a chain link for a crawler chain, wherein the chain link comprises at least two roller tracks extending in parallel, on whose running surfaces at least one track roller is movable during operation of the crawler.

Crawler chains comprise a plurality of chain links which are articulated to each other to form a closed chain. The chain encloses the traveling gear of the crawler drive and serves the locomotion of the vehicle. By means of the crawler, the footprint of the machine is increased, in order to on the one hand improve the traction and on the other hand evenly distribute the machine weight on the ground.

The crawler drive generally consists of at least one driven tumbler wheel, at least one deflection wheel and a plurality of carrier and track rollers on which the chain is running. Tumbler wheel and deflection wheel are mounted at the front and rear in direction of travel, the track rollers are arranged inbetween along the footprint, and the carrier rollers are mounted opposite the track rollers in the region of the chain running back. The tumbler wheel is driven by a suitable drive which is attached to the undercarriage of the working machine. The drive tumbler wheel engages into the individual chain links of the crawler chain and thereby provides for the locomotion of the working machine. The deflection wheel, also referred to as guide wheel, usually is shiftably attached to the undercarriage and thereby ensures the necessary chain tension.

The individual track rollers serve to distribute the load of the vehicle on the resulting footprint of the crawler chain. The contact area between the track rollers and the inner surfaces of the individual chain links is referred to as roller track. There exist variants with one or more roller tracks, of which the second variant provides that each chain link includes two or more roller tracks extending in parallel, on which separate rims of an individual road wheel are running.

The chain links are articulated to each other by connecting means, which however disadvantageously produces a gap between the roller tracks of adjacent chain links. During the locomotion, the track rollers of the crawler drive must pass over the gaps of adjacent chain links, which leads to surges and peaks of the contact pressure. This has a disadvantageous effect on the height of the acting stress moment at the chain links and leads to increased wear, which generally shortens the useful life of the individual components of the crawler drive.

Solution approaches are known from U.S. Pat. No. 5,409, 306 A and EP 2 008 919, by way of example. The chain links disclosed therein comprise two roller tracks which are split in two at their outer edges, in order to provide for a crosswise connection between the individual roller tracks of the chain links. This procedure provides for a smoother passage over the interfaces of adjacent chain links, but it has been discovered in such solutions that the individual chain links exhibit increased wear phenomena at the points of intersection.

SUMMARY OF THE INVENTION

The object of the present invention now deals with an alternative solution approach which on the one hand provides for a smoother transition between the individual chain links of a crawler chain and also is characterized by reduced wear phenomena and hence longer runtimes.

This object is solved by a chain link according to the features herein. Advantageous configurations of the chain link are subject-matter of the features herein.

Proceeding from a generic chain link, the same is modified according to the invention to the effect that the running surfaces of the at least two roller tracks are shaped asymmetrically.

Roller tracks are understood to be the inner surfaces of the chain link, i.e. the faces of the chain link facing the crawler drive components, which get in contact with the mounted track rollers. The surfaces contacting with the rims of the track rollers subsequently are referred to as running surfaces. The same preferably extend parallel to each other in running direction of the chain drive. So far, the running surfaces of the roller tracks extending in parallel have been designed symmetrically. By turning away from symmetry it easily becomes possible that the formed gaps between adjacent chain links either are offset to each other in running direction, but at least are not identical to each other, so that by suitable modification of the running surfaces smaller stress moments occur upon passage by the track rollers.

It is preferred particularly when the running surfaces of the at least two roller tracks have different run lengths. The resulting gaps of the at least two roller tracks of adjacent chain links extending in parallel thereby are offset to each other in running direction, so that the same are passed by the track rollers at different points in time. When passing over a gap, the road wheel thereby contacts at least one further running surface, whereby the resulting stress moment is reduced for the stressed components.

It likewise is conceivable that the asymmetry of the at least two running surfaces of roller tracks extending in parallel leads to the fact that in direction of the longitudinal axis the running surfaces at least sectionally differ from each other by different transverse dimensions.

In a particularly preferred aspect of the invention, the ends of run of the roller tracks form the outer edges of the chain link in running direction, so that the roller tracks of adjacent chain links directly can adjoin thereto, whereby only a very small gap size is obtained between adjacent chain links.

In a particularly preferred aspect it is provided that the running surface of at least one roller track extends from the outermost front end in running direction up to the outermost rear end of the chain link, whereas the at least one second running surface has a shorter run length.

At their front and rear ends as seen in running direction, the chain links preferably have corresponding connecting means, in order to form an articulated connection with adjacent chain links.

As advantageous configurations of the running surface, a quadrangle-shaped, in particular rectangular or square-shaped running surface geometry is recommendable. The running surfaces of adjacent roller tracks in particular can differ in the longitudinal dimension and/or transverse dimension. What is conceivable, for example, is an exemplary embodiment according to which the chain link comprises a first rectangular running surface which extends from the outermost front end of the chain link as seen in running direction up to the outermost rear end of the chain link as seen in running direction, and a second running surface is provided, which extends in parallel and is characterized by a distinctly smaller longitudinal dimension as compared to the first running surface, wherein the second running surface is designed rectangular or alternatively square.

In an alternative aspect of the present invention, the running surfaces of the at least two roller tracks can form a T-shape whose crossbars are oriented in running direction.

The longitudinal bars of the respective T-shape extend transversely to the running direction, wherein the same preferably point in a common direction, so that the crossbar of a first running surface points to the middle of the chain link and the crossbar of the second running surface is directed to the outside.

It likewise is conceivable that the running surfaces of the at least two roller tracks are formed H-shaped and cross-shaped.

The object also can be solved by a chain link for a crawler chain according to the features herein. Accordingly, the chain link comprises at least two roller tracks extending in parallel, on whose running surfaces at least one track roller is movable during operation of the crawler. According to the invention, the running surfaces differ from each other in terms of their width at their front and/or rear end as seen in longitudinal direction. The resulting gaps therefore are not offset to each other after assembly of the chain, but are achieved by different gap sizes transversely to the running direction and the occurring stress moments can be reduced effectively.

Particularly preferably, the running surfaces are formed fork-like and are aligned to each other point-symmetrically. In the assembled chain links, the stem of the fork shape engages into the fork opening of the adjacent chain link.

The present invention also relates to a chain for a crawler drive consisting of at least two chain links according to the present invention. Accordingly, the chain comprises the same advantages and properties as an individual chain link, which is why a repetitive description will be omitted.

In a preferred aspect of the invention the individual chain links of the chain according to the invention are formed identical at least for the most part, wherein adjacent chain links are mounted rotated to each other by 180°. It thereby is achieved that the asymmetrical running surface geometries of the individual chain links are present in a manner alternating in running direction. The above-described advantages thereby are achieved in a particularly effective and simple way, i.e. the chain is characterized by distinctly less wear phenomena due to stress-free transitions of the road wheels along the roller tracks of the chain.

Finally, the present invention relates to a working machine, in particular an earth-moving machine or a crawler crane, with at least two crawler drives which are equipped with chain links according to the present invention. The working machine accordingly is characterized by the same advantages and properties with respect to the chain link according to the invention, which is why a repetitive description also will be omitted at this point for the sake of simplicity.

BRIEF DESCRIPTION OF THE DRAWINGS

Further advantages and properties of the invention will be explained in detail below with reference to the exemplary embodiments illustrated in the Figures, in which:

FIG. 6*a* shows a top view of one configuration of the crawler chain portion according to the invention;

FIG. 6*b*: shows a top view of an alternative configuration of the crawler chain portion according to the invention:

DESCRIPTION OF THE PREFERRED EMBODIMENTS

Figure 1:
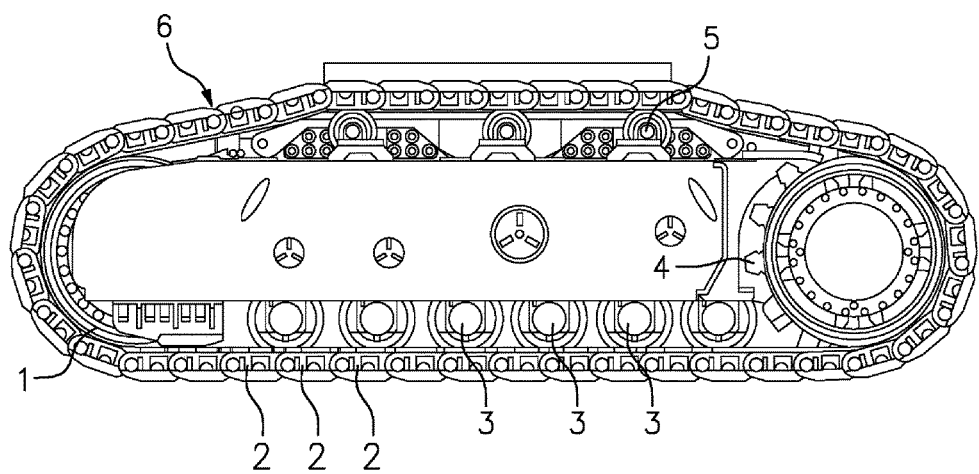
FIG. 1: shows a side view of the crawler drive for a working machine according to the invention.

FIG. 1 shows a side view of the crawler drive for an earth-moving machine or a crawler crane according to the invention. The illustrated crawler drive is attached to the undercarriage of the corresponding working machine and serves for the locomotion of the machine.

The crawler drive comprises a driven tumbler wheel 4 which is driven for locomotion via a suitable drive mounted on the undercarriage.

At the illustrated left end of the crawler drive the guide wheel 1 is located, around whose circumference the crawler chain 6 is running. The guide wheel 1 provides a sufficient tension of the chain 6, which is achieved by movably mounting the guide wheel on the undercarriage. The crawler chain 6 is running on the carrier rollers 5 mounted on the upper edge of the uppercarriage, in order to sufficiently support the chain 6 and avoid sagging thereof.

Near the ground, a total of six track rollers 3 are provided along the footprint, in order to uniformly introduce the machine weight or the contact pressure into the ground over the footprint. In the illustrated exemplary embodiment, the track rollers 3 are attached uniformly spaced between the tumbler wheel 4 and the guide wheel 1, and differences both in terms of number and with respect to the distance of the track rollers 3 to each other easily are conceivable.

Figure 2:
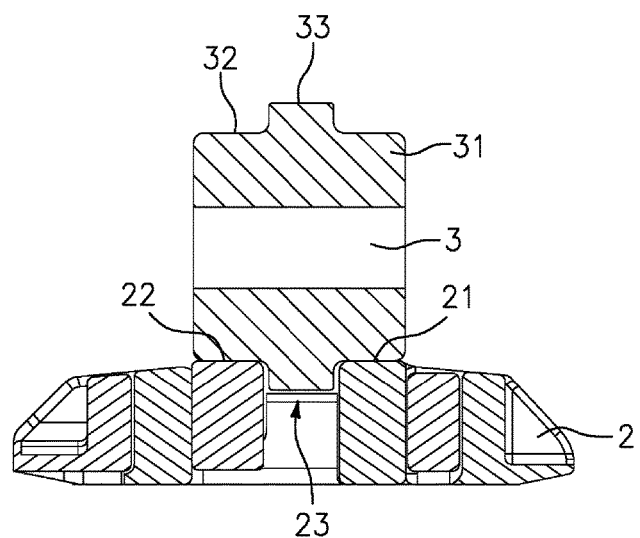
FIG. 2: shows a cross-section through the combination of chain link and track roller.

The crawler chain 6 is composed of individual chain links 2 which are articulated to each other via bolt connections. FIG. 2 shows a cross-section through an individual chain link 2 of the crawler chain 6 and the track roller 3 contacting the chain link in the region of the footprint.

There are shown two separate track rims 31, 32 of the track roller 3 with the same diameter and identical rim width. During the locomotion of the vehicle, both track rims 31, 32 are running over the inside of the individual chain links 2, i.e. are carried by a defined running surface 21, 22 on the inside of the chain links 2. Between both track rims 31, 32 there is a guide wheel 33 with a diameter increased with respect to the rims 31, 32, which in the recess 23 of the chain link 2 as shown between the running surfaces 21, 22 is running either freely or without continuous contact to the chain link 2. The side walls of the running surfaces 21 provide a sufficient guidance of the track roller 3 on the chain link.

Figure 3:
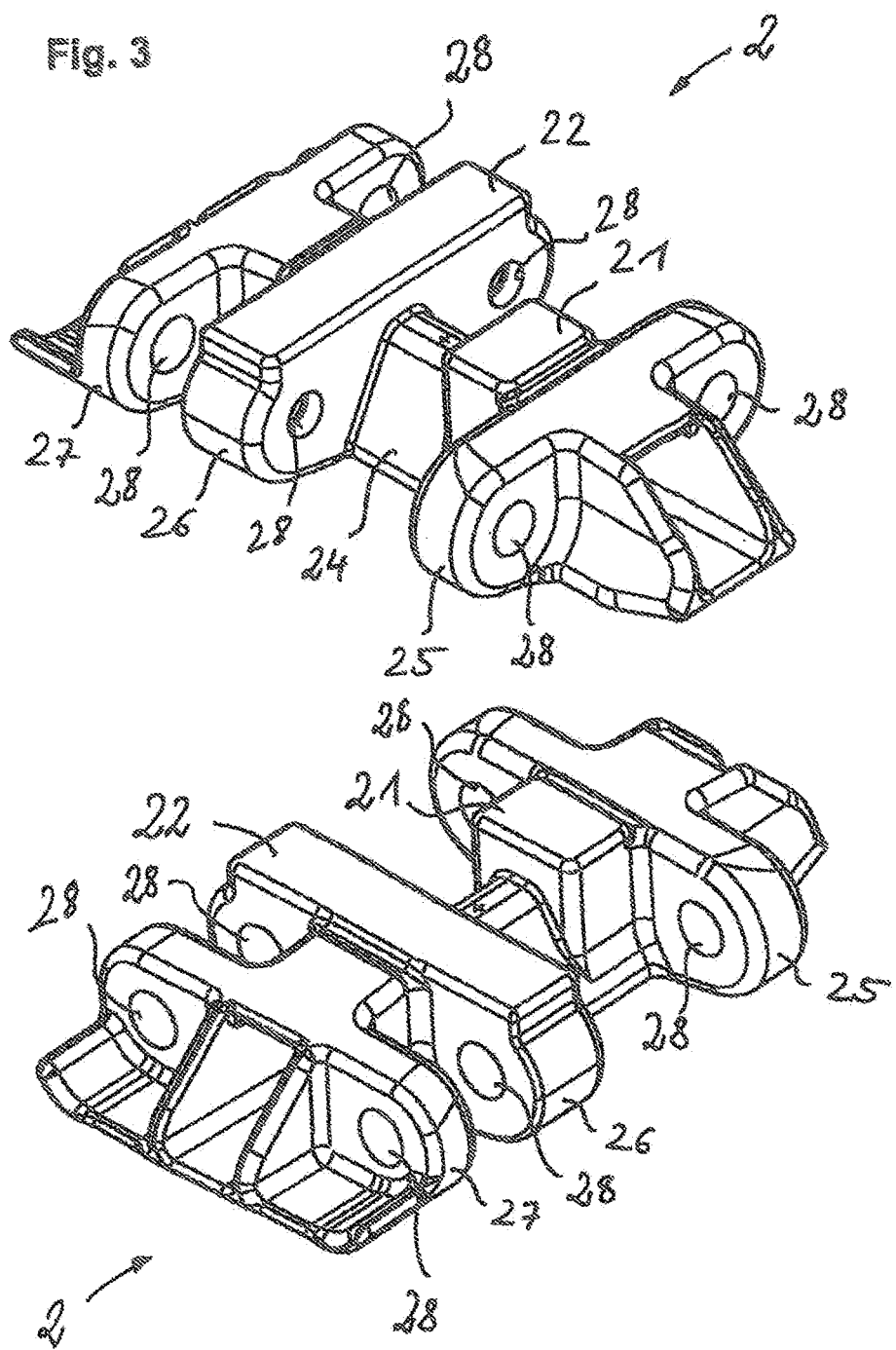
FIG. 3: shows two isometric representations of the chain link of the invention according to a first design variant.
Figure 4:
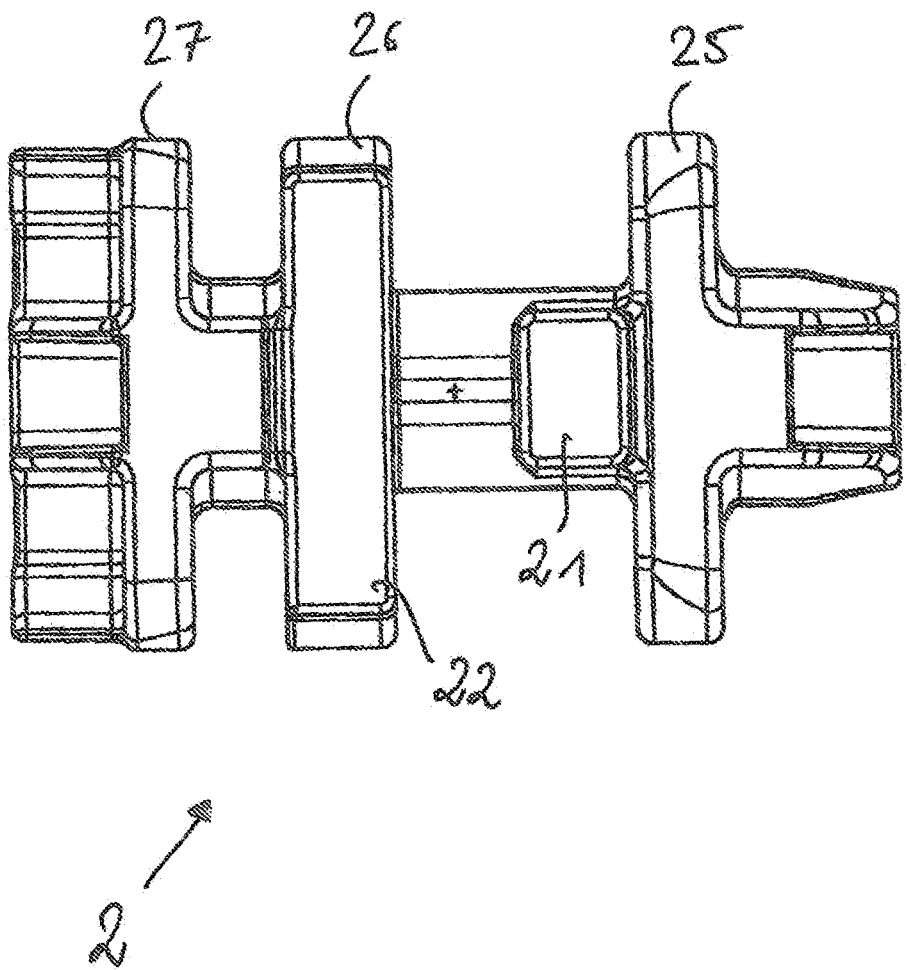
FIG. 4: shows a top view of the chain link of the invention according to FIG. 3, FIG. 5: shows a section of a crawler chain composed of the chain links according to the invention from different viewing directions.

For illustrating the idea according to the invention, which is behind the construction of the chain links 2, reference is made to the representations of FIG. 3, which shows two isometric representations of the chain link 2 according to the invention, and to the top view of FIG. 4. Each chain link 2 usually is fabricated as individual casting, whose shape can be described by a crossbar or web 24 acting as tooth transversely to the direction of travel and three longitudinal webs 25, 26 and 27 extending parallel to each other in direction of travel. The webs 25, 26 and 27 include eyes 28 at the front and rear for accommodating the bolts.

Figure 5:
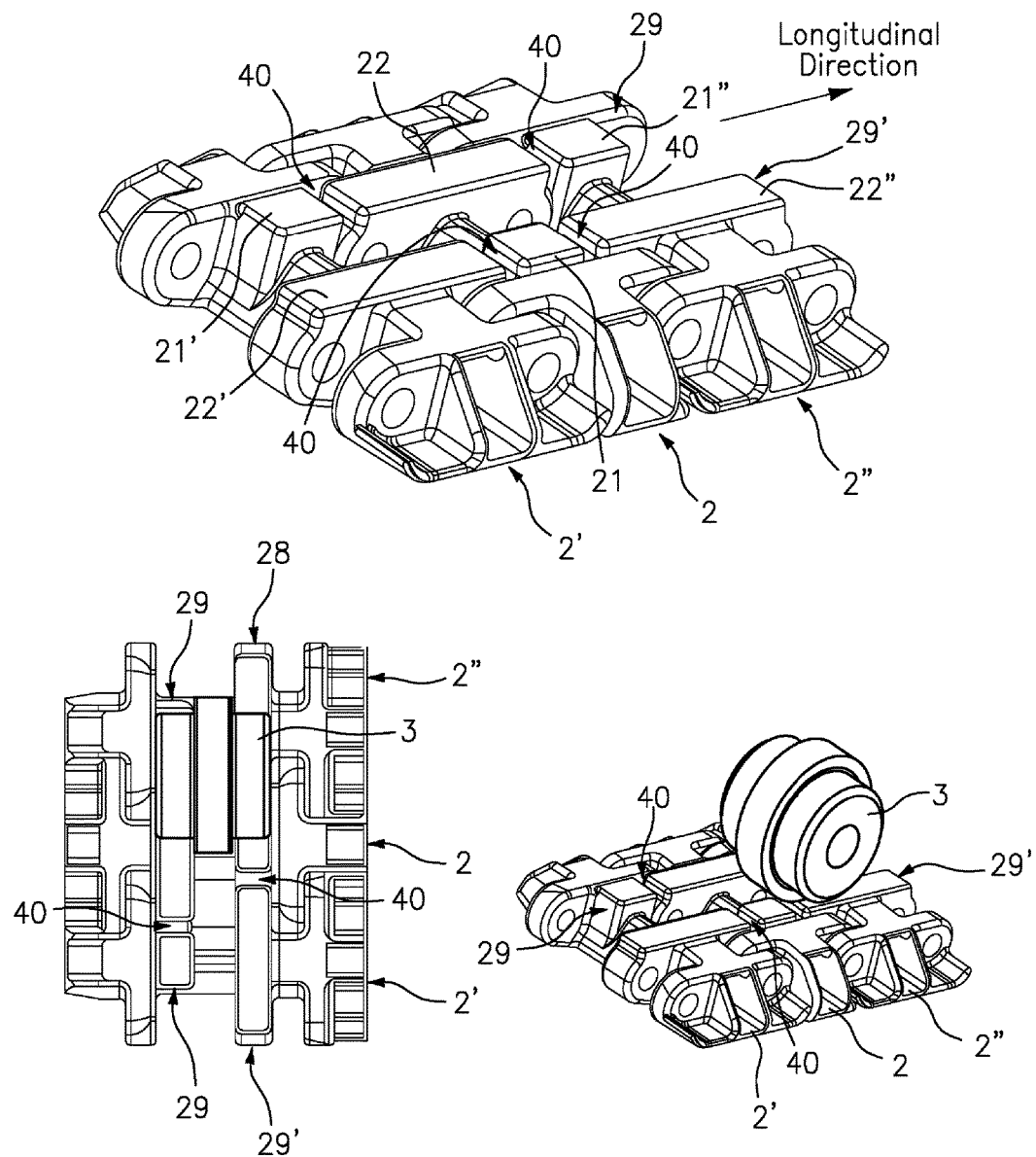

The distance between the webs 25, 26 and 27 and the eyes 28 is chosen such that an identical chain link 2' rotated by 180° can by articulated to the chain link 2, in that a bolt can be put through the overlapping eyes 28, 28' of the chain links 2, 2'. The distance between the webs 26, 27 is chosen smaller than the distance between the webs 25 and 26. The clearance between the webs 25, 26 and 27 offers sufficient space, in order to accommodate the front edges of the webs 25', 26' and 27' and put a bolt (not shown) extending transversely to the direction of travel through the eyes 25, 25' arranged one beside the other. A representation of a total of three chain links 2, 2', 2" articulated to each other is shown in FIG. 5.

The central web 26 includes a flat, continuous running surface 22 which forms a first roller track of the crawler chain 6. The height level of the running surface 22 is raised with respect to the surfaces of the webs 25, 27 and of the crossbar 24. On the inside beside the outer web 25 there is also formed a cuboid body on the crossbar 24, whose surface forms the second running surface 21 and which reaches the same height level as the running surface 22.

The running surface 21 however is shortened with respect to the running surface 22 as seen in running direction, i.e. it is characterized by a shorter running surface length. Both running surfaces 21, 22 are rectangular. Between the two running surfaces 21, 22 the surface of the crossbar 24 is recessed, in order to create sufficient space for the central guide wheel 33 of the track roller 3. On the bottom side of the chain links 2, base plates can be mounted in addition.

Due to the construction described above, an asymmetrical shape of the individual chain link 2 is obtained, in particular the two running surfaces 21, 22 are asymmetrical. The advantages of this construction can be explained comprehensibly with reference to FIG. 5. The total of three assembled chain links 2, 2', 2" are articulated to each other via the bolt connections. It can also be seen that the central chain link 2 is mounted in a way rotated by 180° with respect to the adjacent chain links 2' and 2". The roller tracks 29, 29' obtained by the assembly are characterized in that the gaps 40 between the running surfaces 21, 21', 21", 22, 22', 22" of the individual chain links 2, 2', 2", which are obtained due to the articulated connections, are offset to each other in longitudinal direction between the roller tracks 29, 29' extending in parallel. The consequence is that when running along on the roller tracks 29, 29' the track roller 3 always is carried completely by the roller track 29 extending in parallel, when it passes over a gap 40. The track roller 3 never simultaneously passes over a gap transition 40 of both roller tracks 29, 29'. This measure not only results in smoother running properties of the crawler drive, but there is also less wear at the track rollers 3 or the chain links 2.

FIG. 6a shows a top view of the assembled chain links 2, 2' and 2", wherein here for better comprehensibility the resulting roller tracks 29, 29' were indicated by black bars. Hence, it can clearly be seen that each roller track 29, 29' of the crawler chain 20 alternately is composed by short and long running surfaces 21, 22', 22" or 22, 21', 21".

FIG. 6b shows an alternative configuration of the chain link 2 or the track roller 3 according to the invention. In this exemplary embodiment, not only the running surfaces 21, 22 serve for forming the roller track 29, 29', but at least a part of the webs 25, 27 likewise has a surface with adapted height level, so that the resulting running surfaces 210, 220 are increased correspondingly. In the exemplary embodiment of FIG. 6b a T-shaped running surface 210, 220 for example is obtained, wherein the two running surfaces 210, 220 differ in the thickness of the crossbar 211, 221 and in the length of the longitudinal bar 212, 222 of the T-shape.

Figure 6C:
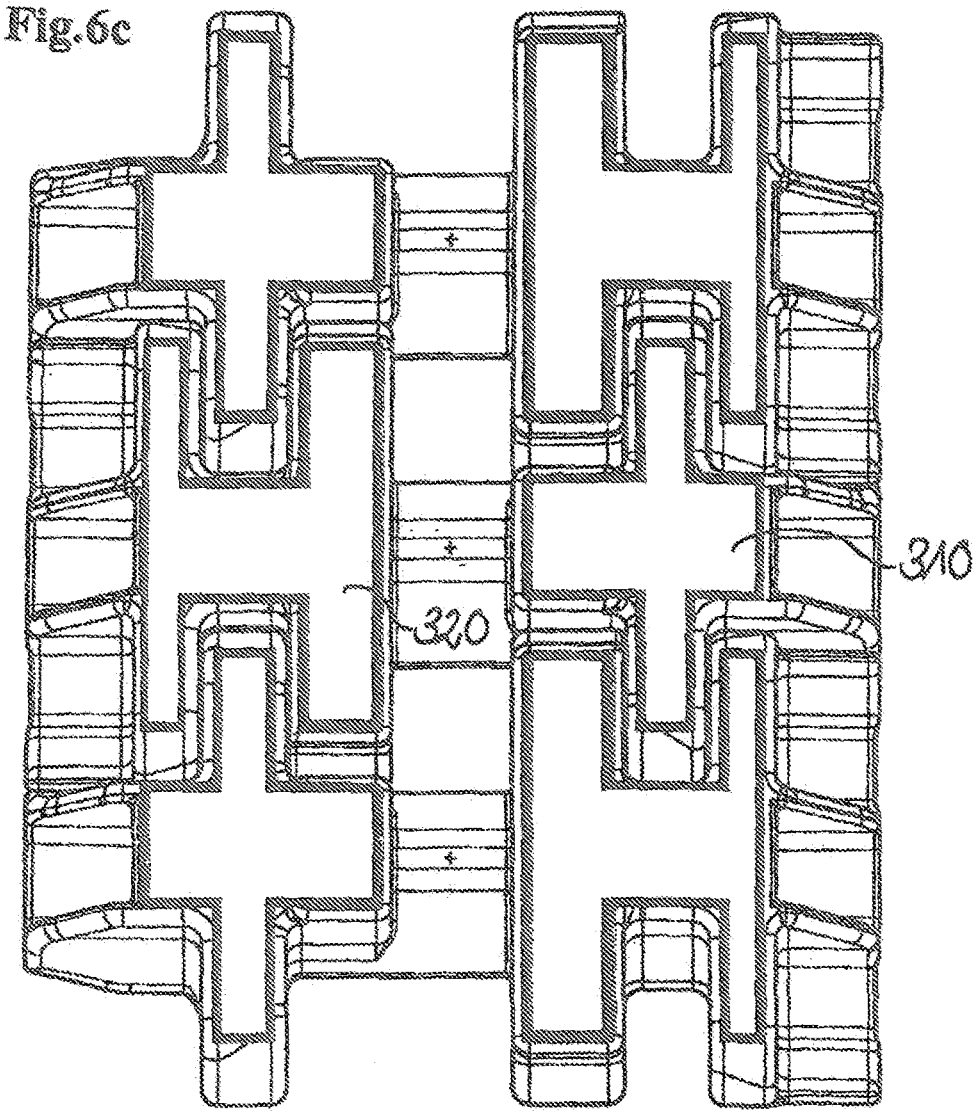
FIG. 6*c*: shows a top view of a further configuration of the crawler chain portion according to the invention.

In the exemplary embodiment shown in FIG. 6c, on the other hand, the complete surface of the webs 25 and 27 additionally is used as running surface. A first running surface 310 thereby obtains a cross shape, while the second running surface 320 forms an H-shape. However, in this example it also applies that the running surfaces 310, 320 of an individual chain link are formed asymmetrically. Both exemplary embodiments 6b, 6c are characterized by the same advantages and properties, but offer an increased stability due to the broadened running surfaces.

Alternatively, reference will be made to the exemplary embodiment of FIG. 7a, which likewise shows different forms of running surfaces. Here, a Z-shaped form of running surface for example is proposed, wherein the parallel running surfaces of an individual chain link are point-symmetrical to each other, and at their front and/or rear end as seen in longitudinal direction the running surfaces differ from each other in terms of their width.

Figure 7A:
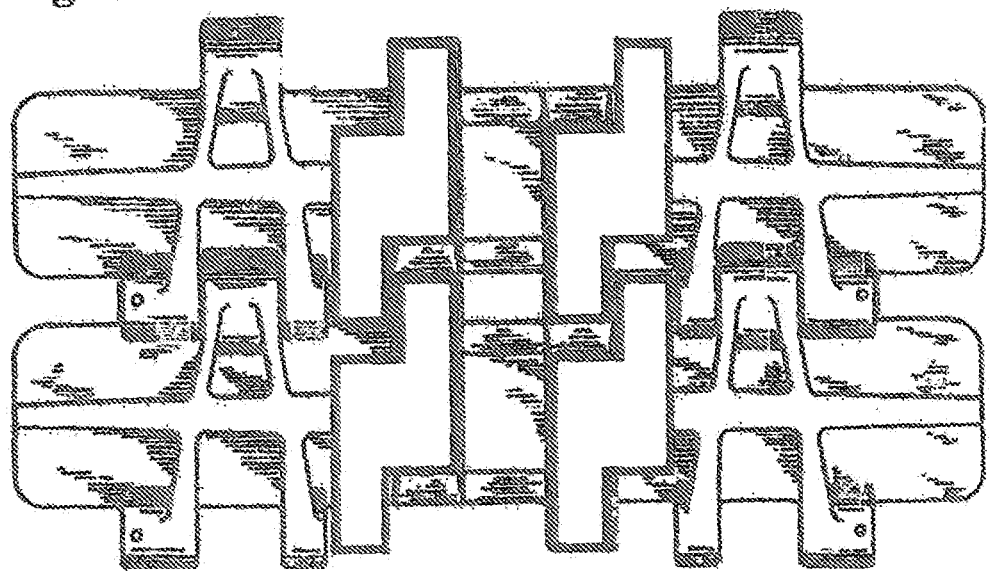
FIGS. 7*a* and 7*b*: show further different embodiments of a crawler chain portion.
Figure 7B:
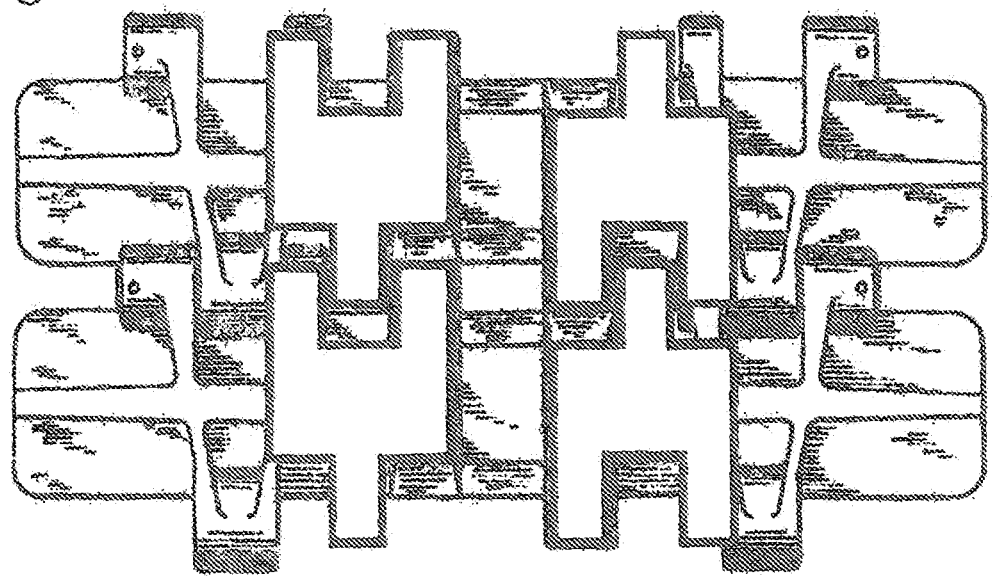

Another exemplary embodiment, which follows the aspect of FIG. 7a, is represented in FIG. 7b. For example, there is shown an approximately fork-shaped form of running surface per roller track, wherein the running surfaces of a chain link are arranged in a manner rotated to each other point-symmetrically by 180°. Here as well, the running surfaces differ from each other in terms of their width at their front and/or rear end as seen in longitudinal direction.

The invention claimed is:

1. A chain link (2, 2,' 2") for a crawler chain (6), wherein the chain link (2, 2,' 2") comprises at least two roller tracks (29, 29') extending in parallel, on whose running surfaces (21, 22; 21',22', 210, 220; 310, 320) at least one track roller (3) is movable during operation of the crawler, wherein the at least two roller tracks (29, 29') extend along opposite sides of a center line extending in a running direction of the tracks (29, 29'), the running surfaces (21, 22; 21',22', 210, 220; 310, 320) of the at least two roller tracks (29, 29') are asymmetrical with respect to the center line, in both the running direction of the tracks (29, 29') and transversely to the running direction of the tracks (29, 29'), have different running lengths and all have an identical height level, and are positioned with respect to one another such that gaps (40) transversely extending between adjacent running surfaces (21, 22; 21',22', 210, 220; 310, 320) are offset from one another in the running direction of the tracks (29, 29') and do not continuously extend transversely across the tracks (29, 29') and the center line of the tracks (29, 29'), such that the track roller (3) is always completely supported by one of the roller tracks (29) in parallel when passing over one of the gaps (40) and does not simultaneously pass over gaps (40) of both tracks (29, 29').

2. The chain link according to claim 1, wherein the running surfaces of the at least two roller tracks at least cross-sectionally differ by different transverse dimensions along the running direction.

3. The chain link according to claim 1, wherein the running surface of at least one roller track extends from the outermost front end of the chain link in the running direction to the outermost rear end of the chain link.

4. The chain link according to claim 1, wherein at its front and rear ends of the chain link end as seen in the running direction, the chain link comprises one or more connecting means for the articulated, releasable connection with another chain link.

5. The chain link according to claim 1, wherein one or more running surfaces are rectangular or square-shaped, and the at least two running surfaces differ in the length of the running direction.

6. The chain link according to claim 1, wherein the running surfaces of the at least two roller tracks form a T-shape whose crossbars extend in running direction and whose longitudinal stems extend in a common direction transversely to the running direction, with adjacent T-shaped surfaces in the running direction oriented oppositely and complementary to one another, and adjacent T-shaped surfaces in the transverse direction oriented identically to one another.

7. The chain link according to claim 1, wherein in both the running and transverse directions, the adjacent running surfaces of the at least two roller tracks alternately form an H-shape and a cross shape.

8. The chain link according to claim 1, wherein the running surfaces are formed fork-shaped and are aligned to each other point-reflection, such that a stem of a fork engages into a fork opening of an adjacent chain link.

9. A chain for a crawler drive having at least two chain links according to claim 1.

10. The chain according to claim 9, wherein the chain links are identical and adjacent chain links are mounted in a manner rotated to each other by 180 degrees about an axis vertical to the running direction.

11. The chain link according to claim 1, wherein the track roller (3) has a guide wheel (33) separating two track rims (31, 32) having identical width and diameter, and with the diameter of the guide wheel (33) being greater than the diameters of the track rims (31, 32).

12. The chain link according to claim 1, wherein the running surfaces (21, 22; 21',22', 210, 220; 310, 320) of the at least two roller tracks (29, 29') are all rectangular.

* * * * *